Oct. 11, 1966  J. L. DEFFENBAUGH ETAL  3,278,244
TRACTOR TRACK SHOE
Filed Sept. 2, 1964  3 Sheets-Sheet 1

INVENTORS
JOHN L. DEFFENBAUGH
FRED E. SIMPSON
BY
Fryer and Fjermold
ATTORNEYS

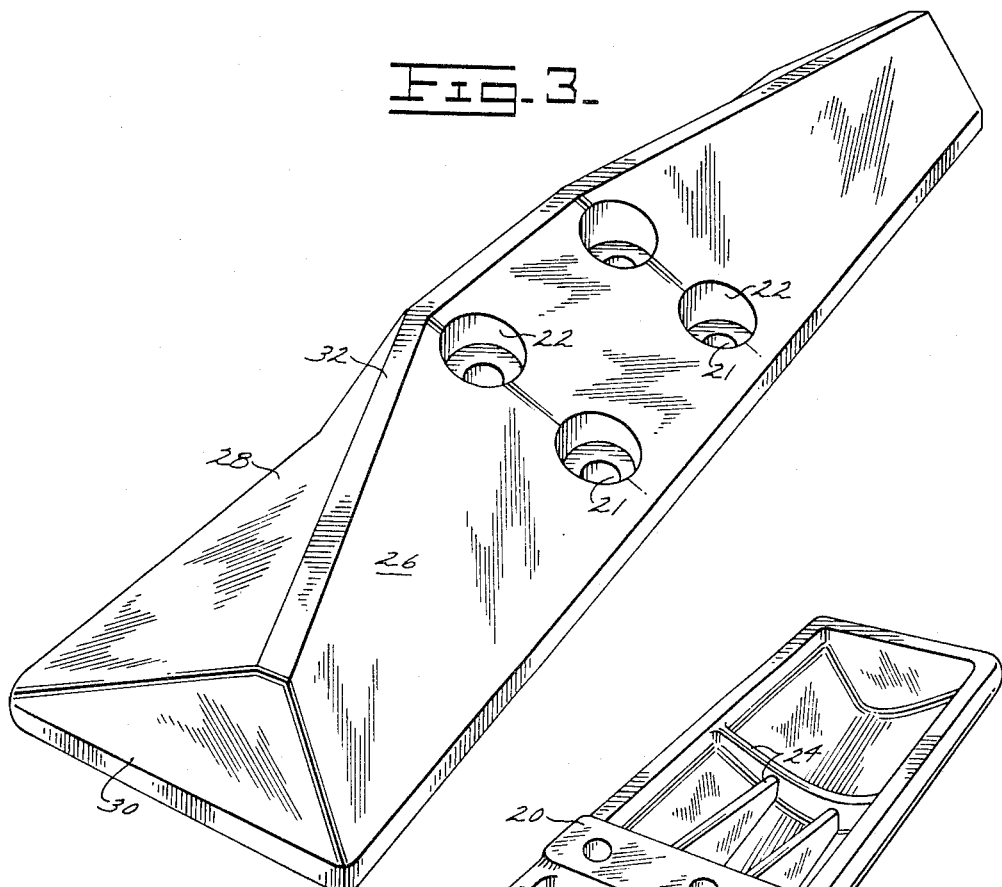
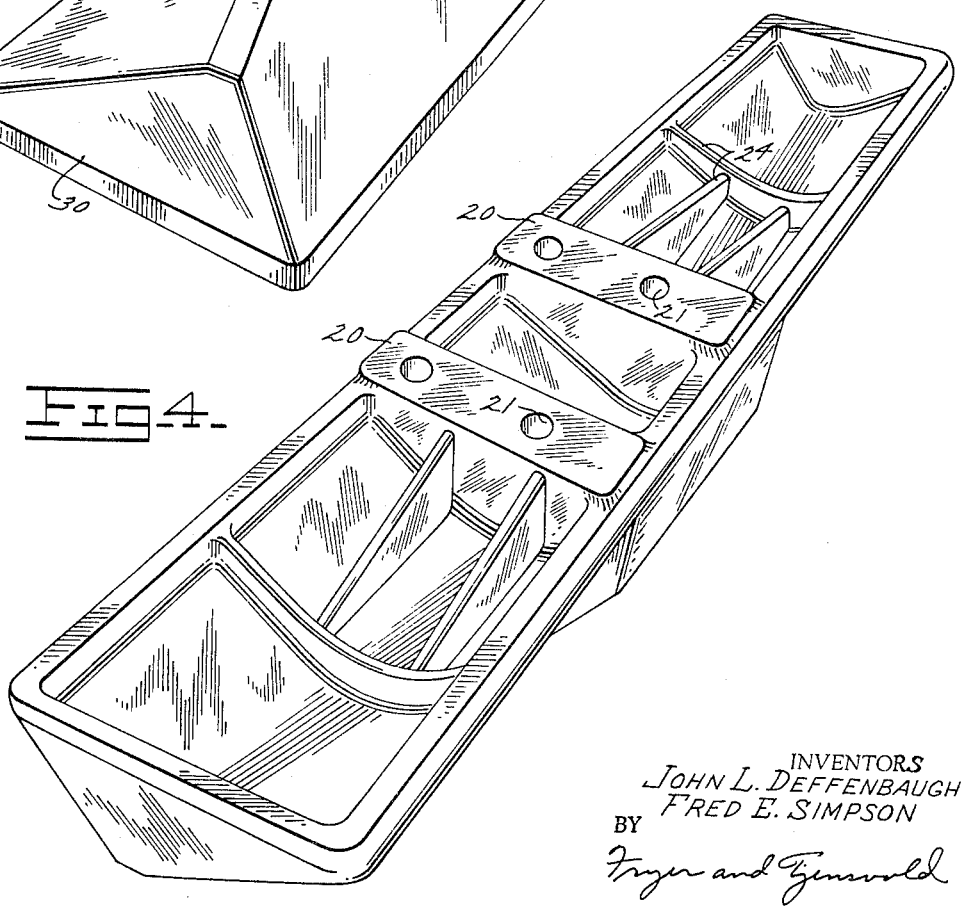

Oct. 11, 1966  J. L. DEFFENBAUGH ET AL  3,278,244
TRACTOR TRACK SHOE
Filed Sept. 2, 1964  3 Sheets-Sheet 3
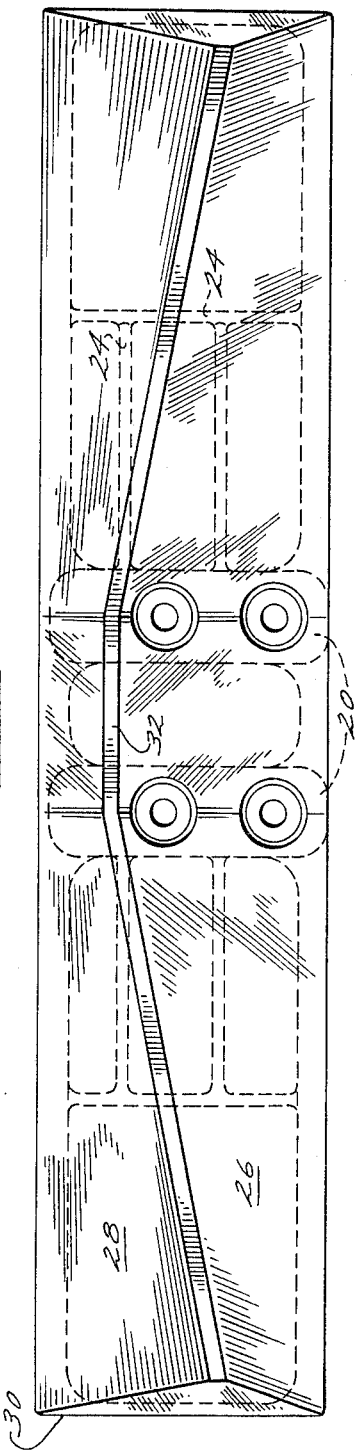
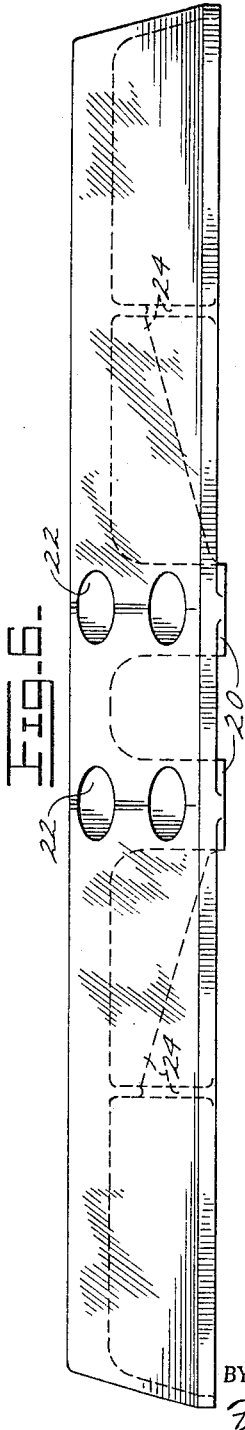
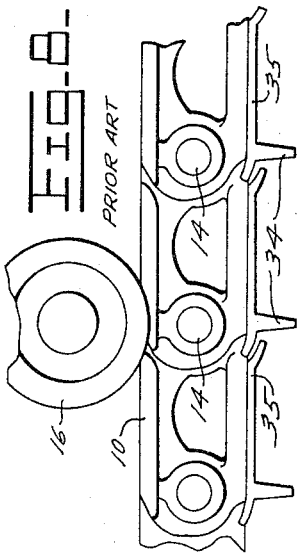
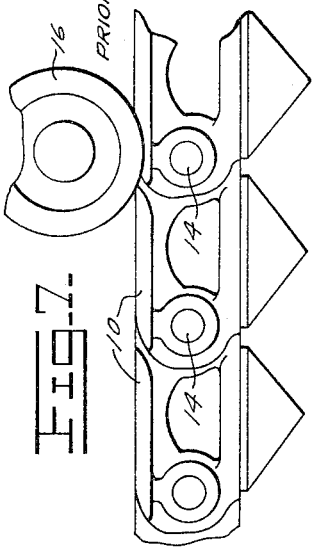
INVENTORS
JOHN L. DEFFENBAUGH
FRED E. SIMPSON
BY
Fryer and Tjensvold
ATTORNEYS United States Patent Office 3,278,244
Patented Oct. 11, 1966

3,278,244
TRACTOR TRACK SHOE
John L. Deffenbaugh, Peoria, and Fred E. Simpson, Washington, Ill., assignors to Caterpillar Tractor Co., Peoria, Ill., a corporation of California
Filed Sept. 2, 1964, Ser. No. 393,832
3 Claims. (Cl. 305—54)

This invention relates to improvements in track shoes for track-type tractors and particularly to low ground pressure shoes designed for use in light or very wet soils.

In light soils such as peat and volcanic ash and also in very wet or swampy areas, the unit load of a tractor on conventional tracks with grousers is often too great for optimum performance and attempts have been made to reduce the unit load by increasing the size and varying the shape of the track shoe. To some extent a shoe of generally triangular cross section with front and rear walls converging toward an apex on the ground engaging side has proven effective. On the other hand such shoes have proven economically impractical because of their destructive effect on the rest of the track assembly. For example, a track assembly comprises track links articulately connected to form an endless chain which is trained over an idler and a sprocket to be driven by the tractor engine. Each link carries a ground engaging shoe and also serves as a part of the moving track which carries the weight of the tractor on its track rollers.

In the triagular type of shoe referred to above the weight on each shoe is imparted to the ground on a straight line or apex of the triangle disposed at a point substantially midway between the axes of track pins and bushings which form the articulated connections between pairs of track links. This produces a tendency of each shoe with its supporting track links to rock in a fore and aft direction about the supporting apex and thus, particularly when the tractor is on a hard surface, subject pins and bearings to shock forces which greatly reduce their useful lives. Any tendency of the track shoe and link assembly to rock also raises the ends of the links causing pounding of the link ends by the track rollers passing over them with resultant excess wear of the rollers as well as the rail surfaces of the links.

It is therefore an object of the present invention to provide a track shoe which overcomes the above disadvantages and to provide a track shoe which has the advantages of a triangular shoe such as that described but is constructed in a manner to prevent the fore and aft rocking motion which is characteristic of triangular shoes.

Further objects and advantages of the invention and the manner in which it is carried into practice are made apparent in the following specification wherein reference is made to the accompanying drawings illustrating a preferred form of the invention.

In the drawings:

FIG. 3 is a perspective view of a track shoe of the present invention disclosing the ground engaging side thereof;

FIG. 4 is a perspective view of the same shoe disclosing the track link engaging side thereof;

FIG. 5 is a plan view of the ground engaging side of a link embodying the present invention;

FIG. 6 is a view in front elevation of the same shoe;

FIG. 7 is a schematic view illustrating a triangular low ground pressure track shoe of the prior art; and FIG. 8 is a similar schematic view of a well-known type of conventional track shoe which attains traction by means of a grouser.

Figure 1:
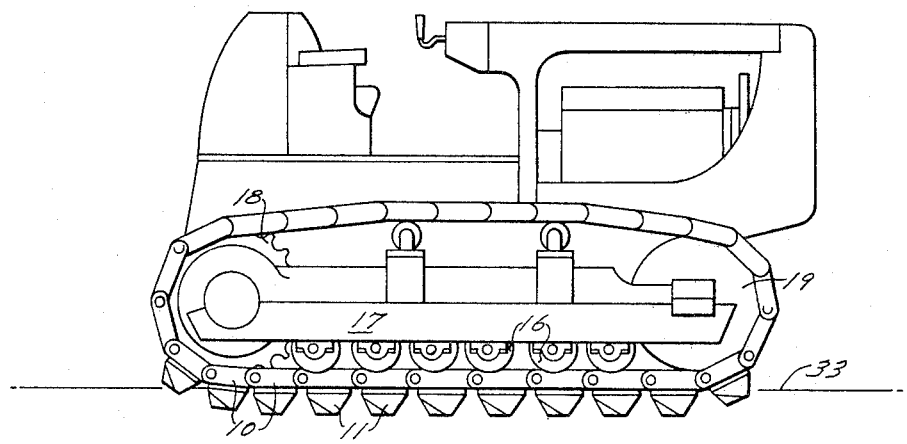
FIG. 1 is a schematic view in side elevation of a track-type tractor equipped with low ground pressure track shoes embodying the present invention.

The conventional track-type tractor of FIG. 1 is illustrated with the usual track mechanism including articulated track links 10 to which track shoes 11 are secured one to each link. The track shoes 11 are shown in greater detail in FIG. 2 as being secured to links 10 by bolts, four of which are provided for each track shoe, two of which are shown at 12 for each link 10, and two identical bolts, not shown, connect the track shoe with an identical track link arranged in a parallel articulated chain connected by pivot pins 14 and conventional pin bushings not shown. Rollers 16 on a truck frame shown at 17 in FIG. 1 support the weight of the tractor as it is driven over the rail surface of the track links 10 by a power actuated sprocket 18 which drives the track over an idler 19 at the forward end of the tractor.

Figure 2:
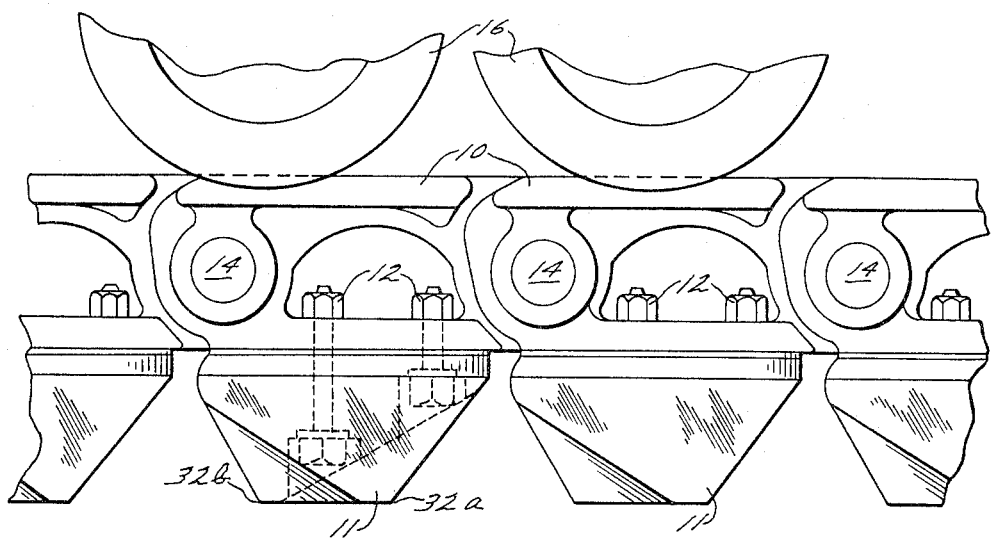
FIG. 2 is an enlarged fragmentary view illustrating the appearance of the improved track shoe with conventional track links and rollers.

The configuration of the track shoe of the present invention is best illustrated in FIGS. 3 to 6, inclusive, wherein it is shown as a generally hollow triangular form having two solid integral partitions 20 spanning its hollow interior and providing rigid material through which bolt holes 21 and counterbores 22 are provided for the reception of the bolts 12 as shown in FIG. 2. The track shoe is generally hollow to reduce its weight but is preferably reinforced with ribs as best shown at 24 in FIG. 4. As shown in FIG. 3 the track shoe has four ground engaging surfaces comprising a front wall 26, a rear wall 28 and two end walls, one of which is shown at 30. All of these four walls converge inwardly toward an apex 32 so that the shoe tends to be self-cleaning and earth is not likely to become lodged between the shoes. When shoes are not self-cleaning and earth becomes packed between them, their ability to penetrate the earth to obtain traction is encumbered.

In operation of a shoe of the kind herein disclosed the earth level may be as high as the broken lines shown at 33 in FIG. 1 so that the shoes are completely embedded in the earth and obtain traction by bearing against the compacted earth between the shoes. Since this compacted earth is in the form of an inverted wedge it tends to fall freely from between the shoes or the shoes leave it as an impression in the ground as the tractor moves forward.

An important feature which distinguishes the present invention from previously known low ground pressure shoes resides in the fact that the apex 32 between the front and rear converging walls 26 and 28 of the shoe is not formed on a straight line. To the contrary, the apex 32 is formed as an arch commencing forwardly of the shoe adjacent the ends and progressing rearwardly of the shoe to an area adjacent the center. As best illustrated in FIGS. 3 and 5, this arch in the present case is formed of three straight segments. It may, however, be curvilinear throughout its length, the principal importance of the arch-like form being that it provides a stable footing for the shoe which prevents rocking motion thereof as the track links are traversed by the track rollers. In explantation of this advantage, FIGS. 7 and 8 show track shoes of the low ground pressure type known to the art and conventional grouser type track shoes respectively.

Referring first to FIG. 7 and bearing in mind that the track links 10 are articulately connected by pins 14, it is evident that the weight imposed upon the track links by a roller 16 tend, when the roller is in the position shown over one of the pins 14, to impart a rocking motion to the links depressing the ends joined by that pin and raising the opposite ends. This is true whether the apexes of the shoes are resting on a hard surface where they might skid or whether they are imbedded in soft material, as illustrated in FIG. 1, where they might compress the material. In either event the track formed by the link 10 assumes an undulating configuration as the roller passes over it which produces a hammering effect between the track and roller. This causes rapid wear of track pins and bushings, and also causes rapid wear of the track rollers and of the rail surfaces of the track links. This wear is considerably less in conventional type shoes with grousers such as illustrated in FIG. 8. In this figure it is apparent that grousers shown at 34 on conventional track shoes 35 are disposed substantially below the track pins 14 about which the track links are pivoted. Consequently, the weight imposed by roller 16 over a track pin is sustained by the grouser, and as the roller advances to a point midway between two track pins, it is sustained by two grousers and there is little if any tendency of the ground-supported portion of the track chain to undulate and cause the resulting destructive shock loads caused by a track such as that illustrated in FIG. 7.

With the present invention, as is most readily seen in FIG. 2, the arched apex of the generally triangular low ground pressure shoe provides a very wide ground contact in a direction longitudinal of the track extending from a forward point 32a to a rearward point 32b. The rearward point 32b is nearly directly under the track pin 14, as are the grousers 34 of FIG. 8, so that the supporting effect of the arched apex 32 is comparable to that of the conventional grouser type shoe and consequent wear on the track components hereinabove described is very greatly reduced. Furthermore, the longitudinal length of the ground engaging surface of the arched apex, which is as indicated in FIG. 2 from 32a to 32b, provides a broad foundation which in itself tends to prevent rocking movement whether the shoe is on a hard surface or packed into a softer material as illustrated in FIG. 1.

We claim:
1. A tractor track substantially rectangular shoe of the kind described in which the ground-engaging surface comprises forward and rearward sloping walls defining a generally triangular hollow body portion comprising a forward area and a rearward area converging toward a common apex extending longitudinally of the shoe, said apex describing an arch extending forwardly and rearwardly of the medial longitudinal plane of the shoe between its ends, the outer ends of the arched apex being disposed forwardly of said plane of said shoe and the central portion thereof being disposed rearwardly of said plane and each of said forward and rearward sloping walls having their respective forward and rearward edges terminating at the respective forward and rearward edges of said shoe.

2. The track shoe of claim 1 in which the arched apex is in a single plane.

3. The track shoe of claim 1 having means to secure it to a track link which has a pivot point adjacent each end, and in which a portion of said arched apex is disposed substantially beneath and in direct supporting relationship to said pivot point.

References Cited by the Examiner

UNITED STATES PATENTS

| | | | |
|---|---|---|---|
| 1,304,357 | 5/1919 | Norelius | 305—54 |
| 1,333,175 | 3/1920 | Johnson | 305—54 |
| 1,421,270 | 6/1922 | McMullen | 305—35 |
| 1,630,089 | 5/1927 | Leake | 305—54 X |
| 1,835,627 | 12/1931 | Bauer | 305—58 X |
| 2,404,488 | 7/1946 | Hait | 305—35 X |
| 2,548,626 | 4/1951 | Sinclair | 305—58 |

FOREIGN PATENTS 818,523   8/1959   Great Britain.

BENJAMIN HERSH, *Primary Examiner.*

R. JOHNSON, *Assistant Examiner.*